(12) United States Patent
Tabacchi et al.

(10) Patent No.: US 8,010,448 B1
(45) Date of Patent: Aug. 30, 2011

(54) SYSTEM FOR REPURCHASE AGREEMENT MATCHBOOK AND METHOD OF RISK MANAGEMENT

(75) Inventors: James Tabacchi, Demarest, NJ (US); Jason Schuit, Merrick, NY (US); Chin-Hung Terence Ma, Allendale, NJ (US); Murat Akgun, Darien, CT (US)

(73) Assignee: Capital Markets Engineering and Trading LLC, New York, NY (US)

( * ) Notice: Subject to any disclaimer, the term of this patent is extended or adjusted under 35 U.S.C. 154(b) by 197 days.

(21) Appl. No.: 12/402,110

(22) Filed: Mar. 11, 2009

Related U.S. Application Data

(62) Division of application No. 10/958,164, filed on Oct. 4, 2004, now abandoned.

(60) Provisional application No. 60/575,083, filed on May 27, 2004.

(51) Int. Cl.
*G06Q 40/00* (2006.01)
(52) U.S. Cl. .................. 705/38; 705/35; 705/37
(58) Field of Classification Search ............. 705/35–38
See application file for complete search history.

(56) References Cited

U.S. PATENT DOCUMENTS

2001/0037284 A1 * 11/2001 Finkelstein et al. ............ 705/37

OTHER PUBLICATIONS

Marcia Stigum, Repo Dealer's Choice, Barron's National Business and Financial Weekly, Oct. 19, 1982; 62, 42.*
Marcia Stigum, Repo Dealers' Choice, Barron's National Business and Financial Weekly, Oct. 19, 1982; 62, 42.
Charles Enoch, Gillan Garcia, V Sundararajan, Recapitalizing Banks with Public Funds, IMF Staff Papers, Washington: 2001. vol. 48, Iss. 1; p. 58, 53 pgs.
Nicholas Boyle, Connie Lee Celebrates Joining Primary Market, But Federal Ties Leave Its Role There Unclear, Bond Buyer, Oct. 18, 1991. vol. 298, Iss. 28757; p. 2.

* cited by examiner

*Primary Examiner* — James A Kramer
*Assistant Examiner* — Hao Fu
(74) *Attorney, Agent, or Firm* — Locke Lord Bissell & Liddell LLP

(57) ABSTRACT

A system for structuring a repurchase agreement matchbook ("repo matchbook") includes in one aspect, separating a repo matchbook from other capital market businesses of a company (such as a dealer). In one embodiment, an independent broker-dealer is created for the sole use of such a dealer. In another embodiment, an independent broker-dealer is created to gain profit by an independent group of investors. Another aspect of the system provides a method for creating a multi-tiered, varied risk capitalization structure for the creation of a new company, which in some embodiments is the independent broker-dealer. A method of risk management that may be applied to the operation of the repo matchbook or another business includes setting out strict operational guidelines for risk mitigation.

32 Claims, 7 Drawing Sheets

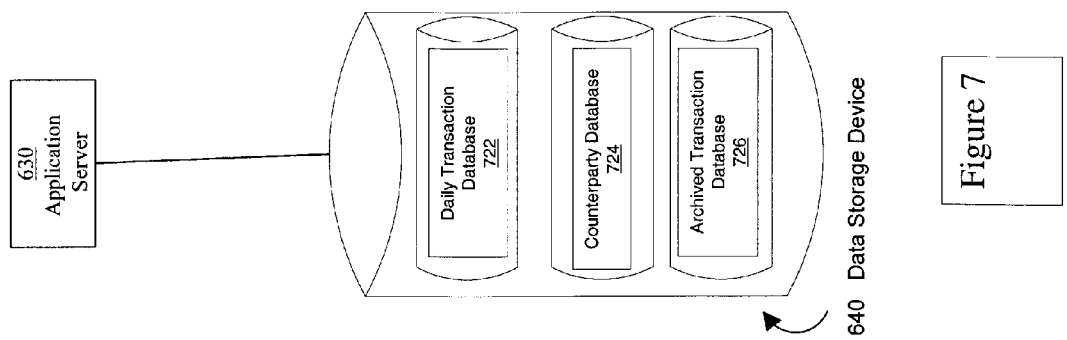

SYSTEM FOR REPURCHASE AGREEMENT MATCHBOOK AND METHOD OF RISK MANAGEMENT

CROSS-REFERENCE TO RELATED APPLICATIONS

This is a divisional application of U.S. Ser. No. 10/958,164 filed on Oct. 4, 2004 now abandoned which claims priority to U.S. Provisional Patent Application Ser. No. 60/575,083 filed on May 27, 2004, which are incorporated herein by reference.

BACKGROUND OF THE INVENTION

Repurchase Agreements and Reverse Repurchase Agreements

A repurchase agreement ("repo") generally involves the sale of a security to a counterparty for cash with an obligation on the part of the seller of the security to repurchase the security at an agreed upon price and/or rate and future date (or upon demand at a future date). In effect, from the perspective of the seller of the security, a repo is a financing or borrowing transaction with the security sold pledged as collateral. A reverse repurchase agreement ("reverse repo") is essentially the same transaction from the buyer's perspective. The buyer buys the security from the seller and the seller agrees to buy the security back on a future date (or upon demand at a future date). In effect, from the perspective of the initial buyer of the security, a reverse repo is a loan collateralized by the security being purchased.

Although repos and reverse repos are individually negotiated transactions, many of these transactions are governed by a Master Repurchase Agreement, prepared by The Bond Market Association as part of an effort to promote greater efficiency in the repo markets by providing for substantially consistent provisions, including with respect to netting and setoff, security substitution, margin maintenance and defaults, from transaction to transaction. The Bond Market Association's Master Repurchase Agreement requires the close out and liquidation of transactions upon the occurrence of certain insolvency events.

Repo transactions are usually arranged in amounts in excess of $1.0 million and often in amounts in excess of $25.0 million. Repos generally have short terms to maturity, typically less than one year and often three months or less, although some have terms up to 24 months. Repos also may be arranged on an open or continuing basis, in which case the transaction is similar to a series of overnight transactions, with rates adjusted based on prevailing market conditions. The applicable interest rate ("repo rate") is established by the counterparties at the outset and is typically a fixed rate for the term of the transaction. It is independent of the coupon rate of the underlying securities, and the seller generally retains the right to any coupon payments on the underlying securities during the term of the transaction. Given the short-term nature of these transactions, repo rates are influenced by, among other things, overall money market conditions.

The securities purchased and sold in repo and reverse repo transactions in the United States are typically U.S. government securities, U.S. government agency securities, U.S. government agency mortgage-backed securities and other instruments that are viewed as having low credit risk. They are valued initially at the current market price (plus, for coupon-bearing securities, accrued interest in accordance with market practice), less a margin or "haircut." By reducing the value of the security by this margin and requiring the sale of additional securities as so valued, equal to the original amount of cash paid for the securities, the transaction is effectively over-collateralized at the outset. Margins generally range from 0.125% to 5.0% depending on the length of the transaction and the nature of the underlying security. For example, an overnight repo involving the sale of treasuries might have a margin of 0.125%, whereas a two-year repo involving the sale of U.S. government agency mortgage-backed securities might have a margin up to 5.0%. Shorter-term repos and repos involving the sale of higher quality securities tend to have lower margins. The value of the underlying securities delivered is adjusted daily (marked to market), and the parties are typically required to maintain a specified margin value. If the value declines, the seller/borrower may be required to sell additional securities into the repo. On the other hand, if the value increases, the buyer/lender may be required to return a portion of the securities.

Market and Market Participants

Repos and reverse repos are a significant part of the U.S. money market, which is the largest and deepest financial market in the world. The money market is a wholesale market for low-risk, highly liquid, short-term, credit market instruments, futures market instruments and the Federal Reserve's discount window.

Unlike organized securities or commodities exchanges, the money market has no organized exchange. Transactions are separately negotiated by telephone or trading terminal. Usually, a large institution clears and settles trades and performs custodial services for the securities involved in the transaction. The major market participants are commercial banks, brokers and dealers, governments, corporations, government-sponsored enterprises (such as Fannie Mae, Freddie Mac and Ginnie Mae), money market mutual funds, futures market exchanges and, perhaps most significant of all, the Federal Reserve.

The money market assists participants in managing routine financial uncertainties. It allows participants to bridge the differences in the timing of payments and receipts that frequently arise in a variety of businesses and industries. Borrowers rely on it for seasonal or short-term cash requirements; lenders use it to offset uneven flows of funds. By providing a means for funds to be placed temporarily, the money market also permits borrowers to time their issuances and lenders to time their purchases of bonds and equities in accordance with their forecasts of stock prices and long-term interest rates.

The market for repos and reverse repos in the United States is very large and growing. According to data of financing activities of primary dealers reporting to the Federal Reserve Bank of New York, which include repos and reverse repos involving U.S. government, U.S. government agency, U.S. government agency mortgage-backed and corporate securities, primary dealers' average volume of total outstanding repo and reverse repo agreements totaled $3.87 trillion during the first half of 2003, an increase of 12.2% from the average volume of $3.45 trillion during the same period in 2002. Outstanding repo agreements averaged $2.25 trillion through June 2003, an increase of 12.6% from the $2.0 trillion volume during the same period of 2002. Outstanding reverse repo agreements averaged $1.61 trillion during the first half of 2003, a gain of 11.5% over the $1.45 trillion during the first half of 2002. According to statistics compiled by the Federal Reserve Bank of New York, for the past ten years, primary dealers' average daily amount of outstanding repos and reverse repos has grown at a compounded annual growth rate of 9.5%.

According to a publication produced by The Bond Market Association, in the first half of 2003, over $122.2 trillion in repo trades were submitted by participants in the FICC (Fixed Income Clearing Corporation—described in more detail below), with an average daily volume of approximately $985 billion. The FICC facilitates orderly settlements in the U.S. government securities market and tracks repo trades settled through its system by product type.

The repo market is complex because it is affected, among other things, by the shape of the yield curve, future interest rates and the relative values of U.S. Securities purchased and sold which changes with interest rates.

The profitability of repo businesses have in many instances displayed low or negative correlation to the general level of economic activity within the United States and to the credit spreads for corporate securities in the marketplace. Part of the reason for this is that in times of market stress the repo market becomes a safe haven for capital looking for high quality, temporary investments. Accordingly, the additional capital tends to depress repo costs at the very short end of the repo yield curve creating additional opportunity for near term positive spreads. As such, an investment in the repo business may provide a diversification opportunity to a portfolio that has exposure to credit spreads and to business cycles.

Description of FICC Netting System

The FICC (Fixed Income Clearing Corporation) is a subsidiary of the Depository Trust & Clearing Corporation and was formed by the merger of the Government Securities Clearing Corporation and the MBS Clearing Corporation. FICC is an industry service organization designed to operate on a not-for-profit basis. The primary purpose of FICC is to ensure orderly settlement in the fixed income securities marketplace. Its mission is to bring both operational and risk management benefits to the clearance and settlement of U.S. Securities and financing products through the provision of automated trade comparison, netting and settlement services for the U.S. Securities marketplace. FICC's automated system is designed to provide real-time interactive communication facilities for the clearance and settlement of U.S. Securities.

Among other services, FICC provides a repo netting system, which is a system for aggregating and matching, on a multilateral basis among system members, offsetting deliver and receive obligations resulting from repos and reverse repos submitted by netting system members. Through its repo netting system, FICC establishes a single net long or short position for each participant's daily trading activity in a given security. The participant's net position is the difference between all long and all short positions in a given security.

FICC minimizes risk by guaranteeing the settlement of all trades entering its netting system. To do so, FICC interposes itself between the original trading parties and becomes the legal counterparty for settlement purposes. Settlement is guaranteed when FICC makes netting results available to participants, usually before 12:00 a.m. the morning after transactions are compared.

FICC replaces each net position with a settlement obligation for the scheduled settlement date. Obligations are settled using Fedwire, which ensures all deliveries are made against full payment. FICC's netting system typically reduces costs associated with securities transfers by reducing the number of securities movements required to settle transactions. Fewer securities movements also reduce daylight overdraft charges, if they occur.

Prior to the implementation of the invention, as may be seen in FIG. 1, an FICC member Dealer 110 initially enters into Repo and Reverse Repo transactions with various counterparties A', B' and C' (120, 130 and 140, respectively). In cases of other FICC member counterparties A' and B' 120, 130, the Dealer may offset assets and liabilities, but only to the extent that this can be done among agreements with counterparties through FICC 150. If a repo/reverse repo transaction has been entered into with a non-FICC member counterparty (e.g., Counterparty C' 140), the Dealer 110 cannot offset this asset and liability, even though a corresponding contract (repo or reverse repo) may be with an FICC member (e.g., Counterparties A' and B' 120, 130).

SUMMARY OF THE INVENTION

The present application is directed to a system and method in the field of financial markets and investments.

In a first aspect of the present invention, a repurchase agreement matchbook ("Repo Matchbook") is separated from other capital market businesses of a company ("Dealer") by creating an independent broker-dealer ("Repo Dealer") solely dedicated to run the matchbook. Among other benefits, this allows the independent repo matchbook to obtain its own credit ratings. Since the risk of a repo matchbook is generally less than those of other capital market businesses, with properly designed risk management and operational policies, higher credit ratings can be obtained with relatively less capital for the Repo Matchbook than if combined with other, more risky capital market businesses. Ultimately, these higher (or highest) credit ratings provide benefits including abilities to enter into agreements with virtually any counterparty desired subject to predetermined risk management policies. That is, in one preferred embodiment, with AAA/Aaa credit ratings, Repo Dealers would not be overlooked for a transaction due to insufficient credit worthiness.

In one embodiment of the invention, the Repo Dealer is created for the benefit of a group of independent investors, for the sole purpose of making a profit. In another embodiment of the invention, the Repo Dealer is created for the benefit of another Dealer.

Among benefits realized through practice of the invention, are the ability to turn a repo matchbook, in which profit is made by an interest differential, into a fee-based business where the Dealer may also act as a servicer. As such, except for an initial fixed investment, no further capital need be invested and no balance sheet is utilized by the Dealer, which now shares in the Repo Matchbook's profit and earns a servicing fee, instead of an interest differential.

Another benefit that is realized is that a Dealer, whose credit ratings might have been considered too low, can now gain a profit (in the form of profit sharing and servicing fee) from repo transactions with counterparties with which they had previously been unable to transact. That is, since Repo counterparty may require very high credit ratings, and a Dealer's credit ratings might not meet such criterion, the Dealer cannot enter into a repo/reverse repo transaction with such counterparty. With the highest credit ratings possible, Repo Matchbook enables the Dealer to transact with a much wider range of counterparties.

In a second aspect, the system is established by creating a Repo Matchbook using funds obtained from one or more third-party sources.

In a third aspect of the present invention, funding is obtained from multiple sources in a tiered-risk arrangement. That is, a structure under which profit and risk are shared unevenly among investing parties, is provided. Certain investors or groups of investors are provided higher returns commensurate with higher risk, the specific magnitudes of which are predetermined. In this third aspect, a Repo Matchbook is capitalized with highly structured "synthetic equity" to achieve the highest possible credit ratings (AAA/Aaa). To achieve this, respective agreements are made between the Repo Matchbook and investing parties that outline the respective risk that they will undertake and the respective percent of profit that they will receive.

Should the Repo Matchbook become insolvent, the collateral used to secure the Repo agreements is liquidated in order to offset any losses. In a situation where daily margin requirements have been met, any loss should be essentially zero. The collateral inherent in Repos acts as a first line of defense, helping protect from other losses.

However, should any further money be lost, it is absorbed sequentially in segments starting with a first amount of unrated Junior Equity. In certain embodiments, this junior equity is purposely not insured against losses, and is the first to be lost if any losses are experienced by the Repo Matchbook. If further losses are sustained beyond this first amount, tiers of Junior and Senior Notes would be the next and last, respectively, to lose money. However, these Notes are typically insured against any loss, depending on the specific implementation. In one embodiment, without insurance, the Junior Note is rated BBB/Baa2, but with insurance, AAA/Aaa ratings are achieved. Without insurance, the Senior Note in the same embodiment is rated AAA/Aaa, and thus, any insurance would make such an investment that much more secure. Where complete insurance coverage for all losses for the Junior or Senior Notes is provided, the only real risk is that the insurance company would become insolvent.

Proper implementation of a risk management policy for a Repo Matchbook affords a lower probability of substantial losses. However, a possibility for some losses exists. Accordingly, some investors will agree to undertake higher risk by being among the first party or parties to absorb any losses ("Junior Equity") sustained by the Repo Matchbook. These investors are, depending on the implementation, compensated with increased rates of return on their investments. The particular gradations of risk and return depend on the specific implementation, but the involvement of multiple investing parties is easily implemented under this system.

As a further assurance to the security of the investors in the Junior and Senior Notes, and thus a further boost to the credit ratings of the subject Repo Matchbook, an insurance carrier may be retained to secure investments against loss in excess of Junior Equity. Depending on the specific implementation of the system, different tiers of risk are insured to different degrees. For example, if a party invests $5 million in the Junior Note, with the understanding that it is undertaking a sizable risk in doing so (i.e., this party would be the second to lose its investment after the unrated equity investors), an insurance carrier may secure all or a portion of the risk, naturally, for a cost. However, the resultant risk for the investor is substantially reduced.

In a fourth aspect of the present invention, unique financial models are followed and are incorporated into a trading system as part of a risk management policy for a Repo Dealer operating a Repo Matchbook. These financial models restrict the type of repo agreements into which the Repo Matchbook may enter and restrict contract tenor and type of collateralization (e.g., U.S. Treasury bonds) used, among other factors. It should be noted that while in some embodiments contract tenor and types of contracts are specified, that maximum allowable lengths of contracts can vary, depending on the particular implementation and the objective of those entering into the pertinent agreements.

BRIEF DESCRIPTION OF THE DRAWINGS

FIG. 7 is a diagrammatic representation of databases within a data storage device of the computer system of the subject Repo Dealer.

DETAILED DESCRIPTION

Figure 1:
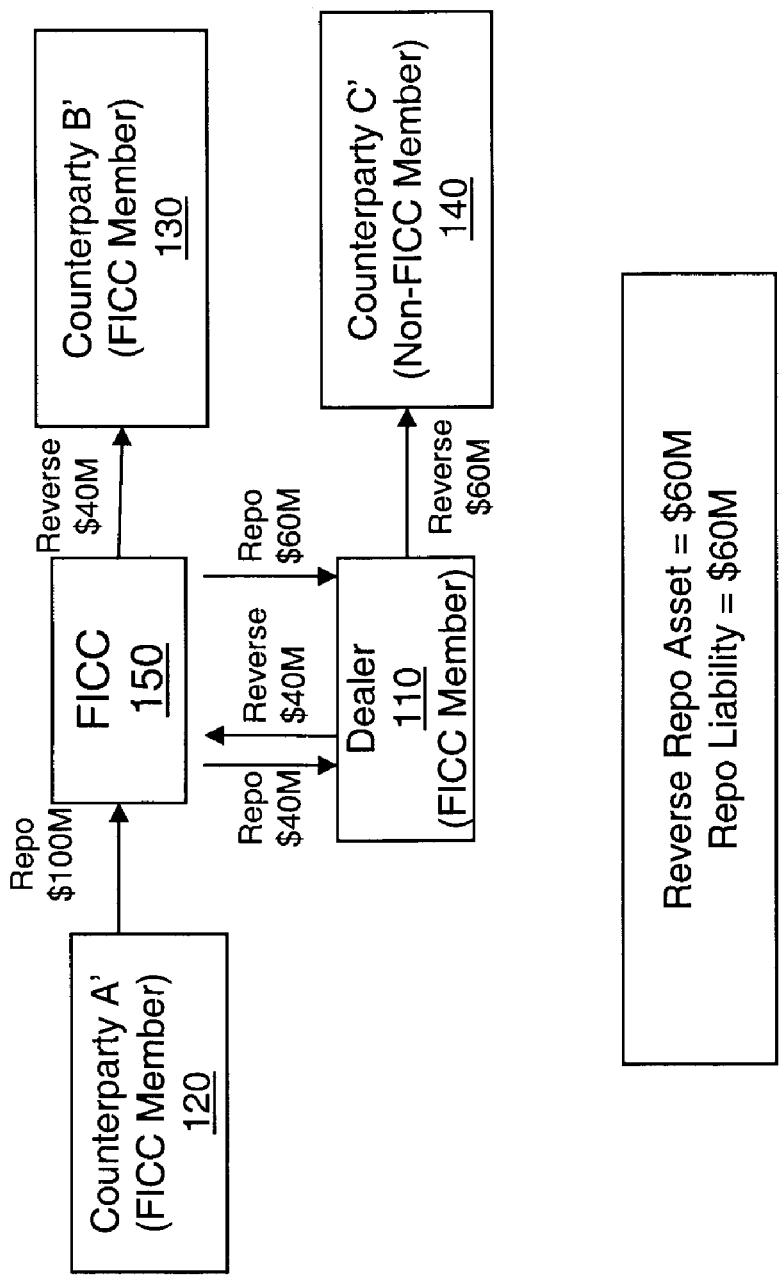
FIG. 1 illustrates example prior art interactions between a broker-dealer, and various counterparties through FICC.
Figure 2:
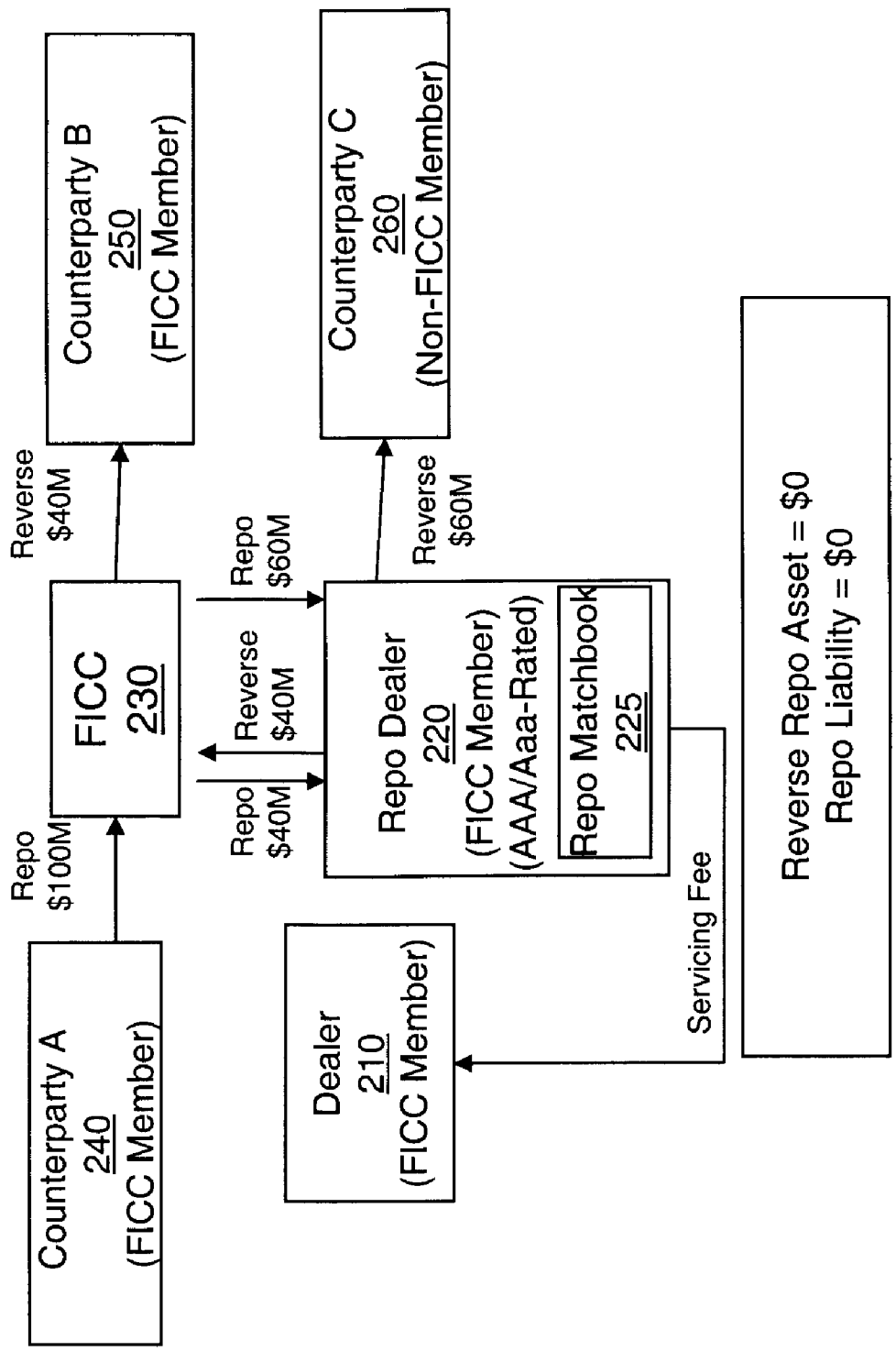
FIG. 2 illustrates an example embodiment of a dealer, independent Repo Dealer, various counterparties and the FICC according to the present invention.

As seen in FIG. 2, a repurchase agreement matchbook 225 is separated from other capital market businesses of a company ("Dealer") 210 by creating an independent Repo Dealer 220 to manage the repurchase agreement matchbook 225. Among other benefits, this allows the independent Repo Dealer 220 to obtain its own credit ratings. Since the risk of a repo matchbook is generally less than those of other capital market businesses, with properly designed risk management and operational policies, higher credit ratings can be obtained with relatively less capital for the Repo Matchbook than if combined with other, more risky capital market businesses. Ultimately, these higher (or highest) credit ratings provide benefits including abilities to enter into agreements with virtually any counterparty desired subject to predetermined risk management policies. That is, in one preferred embodiment, with AAA/Aaa credit ratings, the Repo Dealer 220 would not be overlooked for a transaction due to insufficient credit worthiness.

According to one embodiment of this first aspect of the present invention, a parent company ("Parent Company") or Dealer 210 establishes and administers, for its own account, portfolios of repurchase agreements and reverse repurchase agreements involving U.S. government securities, certain U.S. government agency securities and certain U.S. government agency mortgage-backed securities (collectively, "U.S. Securities"). The Parent Company/Dealer 210, in this embodiment, conducts repo and reverse repo programs through one or more wholly-owned subsidiary Repo Dealers 220, such as that are registered with the U.S. Securities and Exchange Commission (the "SEC") and are members of the National Association of Securities Dealers, Inc. (the "NASD"). It should be noted that in many instances in the discussion of the present invention, a bank may take the place of a Dealer or broker-dealer, and function similarly to and obtain similar benefits to the Dealer and/or broker-dealer(s) that are described in detail herein.

The Dealer 210 may, depending on the embodiment, refer all or a portion of the Repo Dealer's 220 clients to the Repo Dealer 220. Also, depending on the embodiment, the Dealer 210 may act as a servicer for the Repo Dealer 220, and receive a servicing fee therefor. Accordingly what previously was income based on margin earnings for the Dealer 210 has become a fixed servicing fee or a fixed servicing fee plus a share of profits in the Repo Dealer's 220 earnings, depending on the embodiment.

As can be seen, in FIG. 2, counterparty A 240 has a repo transaction through FICC 230 with the Repo Dealer 220 in the amount of $100 Million. Counterparty B has a reverse repo with the Repo Dealer 220 in the amount of $40 Million, also through FCC 230. Non-FICC member counterparty C 260 has a reverse repo contract with the Repo Dealer 220, which is not through FICC.

Since in the embodiment of FIG. 2, counterparty C 260 is not a FICC member, any assets or liabilities with counterparty C 260 cannot be offset on a balance sheet of the Repo Dealer 220. Counterparty A 240 and counterparty B 250 are FICC members, and thus under FASB Interpretation No. 41, these assets and liabilities can be set off if they are of the same tenor and type.

However, benefits are realized in that the balance sheet of the Dealer 210 is freed up, and not bound by un-netable assets and liabilities, as it would have been before implementation of the invention. Instead, the Repo Dealer 220 must now carry un-netable assets and liabilities on its balance sheet.

Among benefits realized through practice of the invention, is the ability to turn a repo matchbook 225, in which profit is made by an interest differential, into a fee-based business where the Dealer 210 may also act as a servicer. As such, except for an initial fixed investment, no further capital need be invested and no balance sheet is utilized by the Dealer 210, which now shares in the Repo Matchbook's 225 profit and earns a servicing fee, instead of an interest differential.

Another benefit that is realized is that a Dealer 210, whose credit ratings might have been considered too low, can now gain a profit (in the form of profit sharing and servicing fee) from repo transactions with counterparties with which they had previously been unable to transact. That is, since a repo counterparty may require very high credit ratings, and a Dealer's credit ratings might not meet such criterion, the Dealer 210 cannot enter into a repo/reverse repo transaction with such counterparty. With the highest credit ratings possible, the Repo Matchbook 225, operated in accordance with the present invention, enables the Dealer 210 to retain its relationships or begin new relationships with a much wider range of counterparties.

Figure 3:
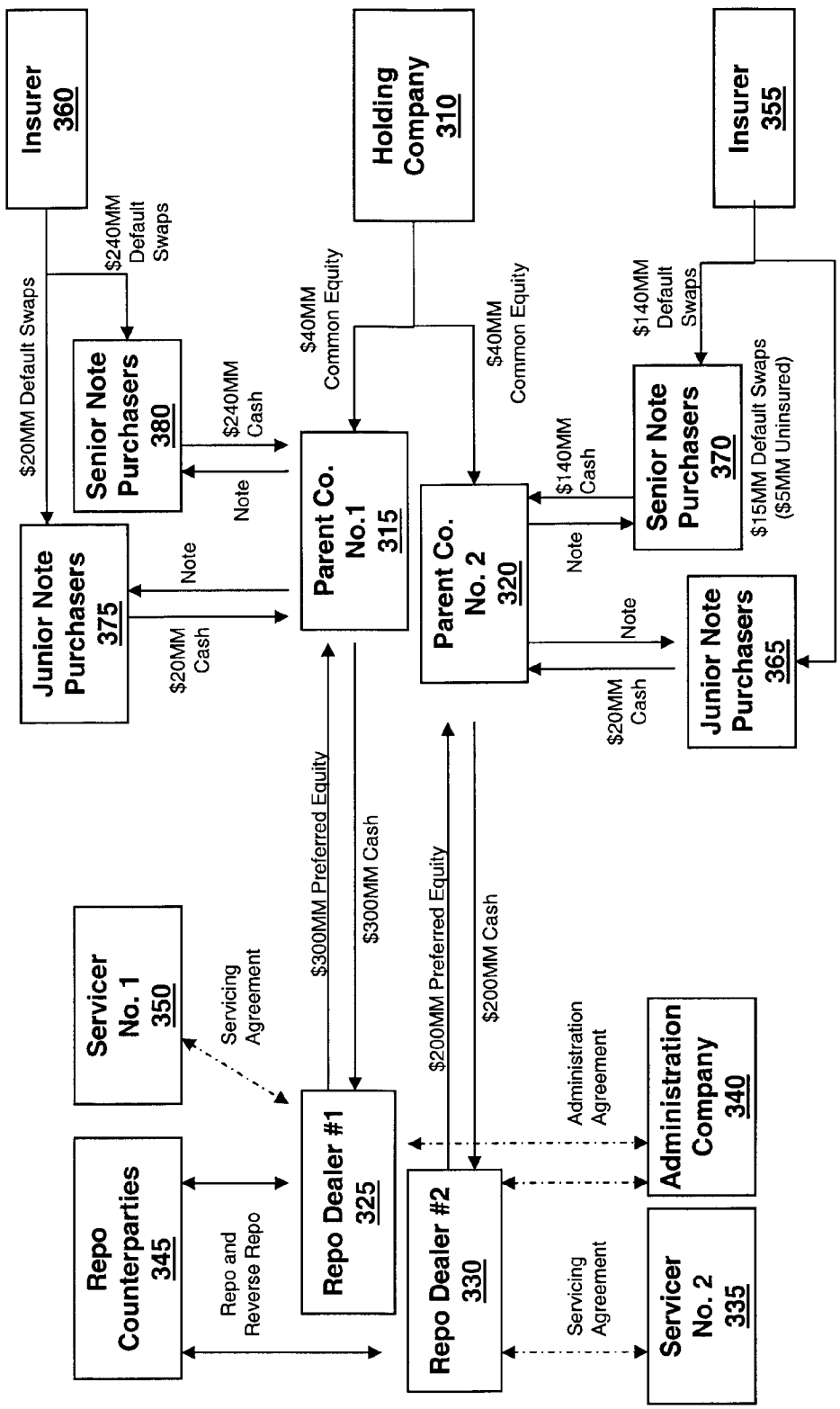
FIG. 3 illustrates an example embodiment of interactions of a holding company, insurer(s), parent companies, independent Repo Dealers, servicers, administrator(s) and counterparties according to the present invention.

In some embodiments, the repo and reverse repo programs are administered by an Administration Company (340 in FIG. 3), which itself may be wholly or partially owned by the Parent Company (310 in FIG. 3). The Administration Company (340) provides management for each repo and reverse repo program in exchange for a fee. Interaction of an Administration Company (340) is described below in connection with FIG. 3.

According to a second aspect of the present invention, a Repo Dealer 325, 330 may be established by the same Parent Company 310 (or by another company) using third-party capital.

FIG. 3 illustrates an example interaction of various entities according to one embodiment of the present invention. In this embodiment, a Holding Company 310 creates two parent companies 315, 320, though this may be one or more in other embodiments. These Parent Companies 315, 320 in-turn create Repo Dealers 325, 330.

In certain embodiments of the invention, the Repo Dealers 325, 330 are created for the benefit of a group of independent investors, for the sole purpose of making a profit. In another embodiment of the invention, the Repo Dealers 325, 330 are created for the benefit of another Dealer (for example, Dealer 210 in FIG. 2). In any of these embodiments, third party capital may be used. This capital is advantageously raised in the manner described below, which is a third aspect of the present invention, and is described in connection with FIG. 4.

According to the foregoing aspects of the invention, the primary business activity of the Repo Dealers 325, 330 involves managing portfolios of matched books of repurchase agreements ("repos") and reverse repurchase agreements ("reverse repos"). Typically, each portfolio as a whole has an equal amount of repo and reverse repo transactions in which a Repo Dealer 325 or 330 is an initial seller and an initial buyer, respectively, for the same type of securities (and therefore is referred to as a "matched book"), although the tenors and interest rates for such transactions are generally not matched in these embodiments.

Under the present invention, revenue is primarily derived from repo and reverse repo matching on the short end of the U.S. Treasury yield curve (two years or less). Revenue is generated through establishing positive interest rate spreads between matching repo and reverse repo transactions by taking advantage of differences in interest rates along the yield curve. For example, if interest rates are higher for longer dated instruments (an upward sloping yield curve environment), longer-term reverse repos are financed with shorter-term repos. In a downward sloping (or inverted) yield curve environment, shorter-term reverse repos are financed with longer-term repos. Thus, many offsetting transactions are not matched as to maturity and interest rate (the "gap"). This gap creates risk as to future financing rates, but preferably, the gap is managed such that all transactions, taken as a whole, in each portfolio provides a positive interest rate spread at an appropriate level of interest rate risk.

While many embodiments of the present invention derive revenue from repos and reverse repos, alternatively or additionally, other transactions with similar economics may be implemented in order to achieve similar results. Such similar economics may include, but are not limited to historical trends including interest rate fluctuations and historical levels of risk.

Table 1, below, illustrates how revenue is generated from matched book repo programs according to the present invention. As shown, a reverse repo is available at a rate of 1.16% per annum for 270 days with U.S. Treasuries and a repo is available in the same size for 178 days at a rate of 1.05%.

TABLE 1

|  | amount | rate | start | end | tenor | revenue/ (expense) |
|---|---|---|---|---|---|---|
| Reverse repo | $100.0 million | 1.16% | Sep. 3, 2003 | May 30, 2004 | 270 | $870,000 |
| Repo | $100.0 million | 1.05% | Sep. 3, 2003 | Feb. 28, 2004 | 178 | $(519,167) |
| Spread | | 0.11% | Sep. 3, 2003 | Feb. 28, 2004 | 178 | $54,389 |

The transactions produce a positive spread for the first 178 days and a net profit of $54,389. However, a 92 day gap exists until the repo price for the example period from Feb. 28, 2004 to May 30, 2004 is established. The favorable spread for the first 178 days reflects the longer tenor of the reverse repo as compared to the repo. Assuming markets remain unchanged, when the gap is closed, a similarly favorable spread can be maintained for the balance of the transaction using the same margin. In this case, an example gap closing transaction is shown in Table 2, below.

TABLE 2

|  | amount | rate | start | end | tenor | revenue/ (expense) |
|---|---|---|---|---|---|---|
| Repo | $100.0 million | 1.05% | Feb. 28, 2004 | May 30, 2004 | 92 | $(268,333) |
| Spread |  | 0.11% | Feb. 28, 2004 | May 30, 2004 | 92 | $28,111 |

Thus, the overall profit in this example is $82,500. Further, assuming the counterparty 345 on the reverse repo transaction and the final repo transaction is the same, and assuming these transactions otherwise satisfy the requirements of FIN41, these transactions could be netted under the provisions of FIN41 and removed from the balance sheet of the Repo Dealer 220, 325, 330.

However, if rates have risen when the gap closing transaction is executed, the above-described gap closing transaction could be as shown in the example shown in Table 3, below.

TABLE 3

|  | amount | rate | start | end | tenor | revenue/ (expense) |
|---|---|---|---|---|---|---|
| Repo | $100.0 million | 1.38% | Feb. 28, 2004 | May 30, 2004 | 92 | $(352,667) |
| Spread |  | −0.22% | Feb. 28, 2004 | May 30, 2004 | 92 | $(56,222) |

Thus, the result is a net loss for the entire transaction of $1,833. Depending on the embodiment, various hedging techniques may be used to mitigate this adverse result. However, wherever a gap is created, adverse market movements may result in losses.

Administration and Servicing

As shown in FIG. 3, an Administration Company 340 has an administration agreement with each of the Repo Dealers 325, 330. The Administration Company 340 provides management for each repo and reverse repo program in exchange for a fee. The Administration Company may manage one, or more than one Repo Dealer 325, 330 depending on the embodiment.

Depending on the embodiment, the Repo Dealer 325 may enlist the assistance of a Servicer 350. The Program Servicer 350 (or "Servicer") may perform certain accounting, credit-related, market risk, compliance, operations and information technology, desktop support functions as well as other services.

The services of the Program Servicer 350 to the Repo Dealer 325 may or may not be exclusive, depending on the embodiment. The Program Servicer 350 may be free to render similar services to others.

The Program Servicer 350, or alternatively, another Servicer (which may be Servicer 335 or still another Servicer), may provide securities clearing services and a clearing credit line in connection therewith for the Repo Dealer.

Likewise, the Program Servicer 350, or other Servicer may act as a paying agent on behalf of the Repo Dealer 325. The Paying Agent shall effect payment of interest on, and principal of, as applicable, the Notes as provided by any Note Purchase Agreement, other agreement, and/or the Notes themselves.

Additionally, the Program Servicer 350 or other Servicer may act as a Calculation Agency for the Repo Dealer 325, calculating the interest rates on Notes in the manner and at the times specified in a Calculation Agency Agreement or other agreement, and provide certain other services incidental thereto.

Figure 4:
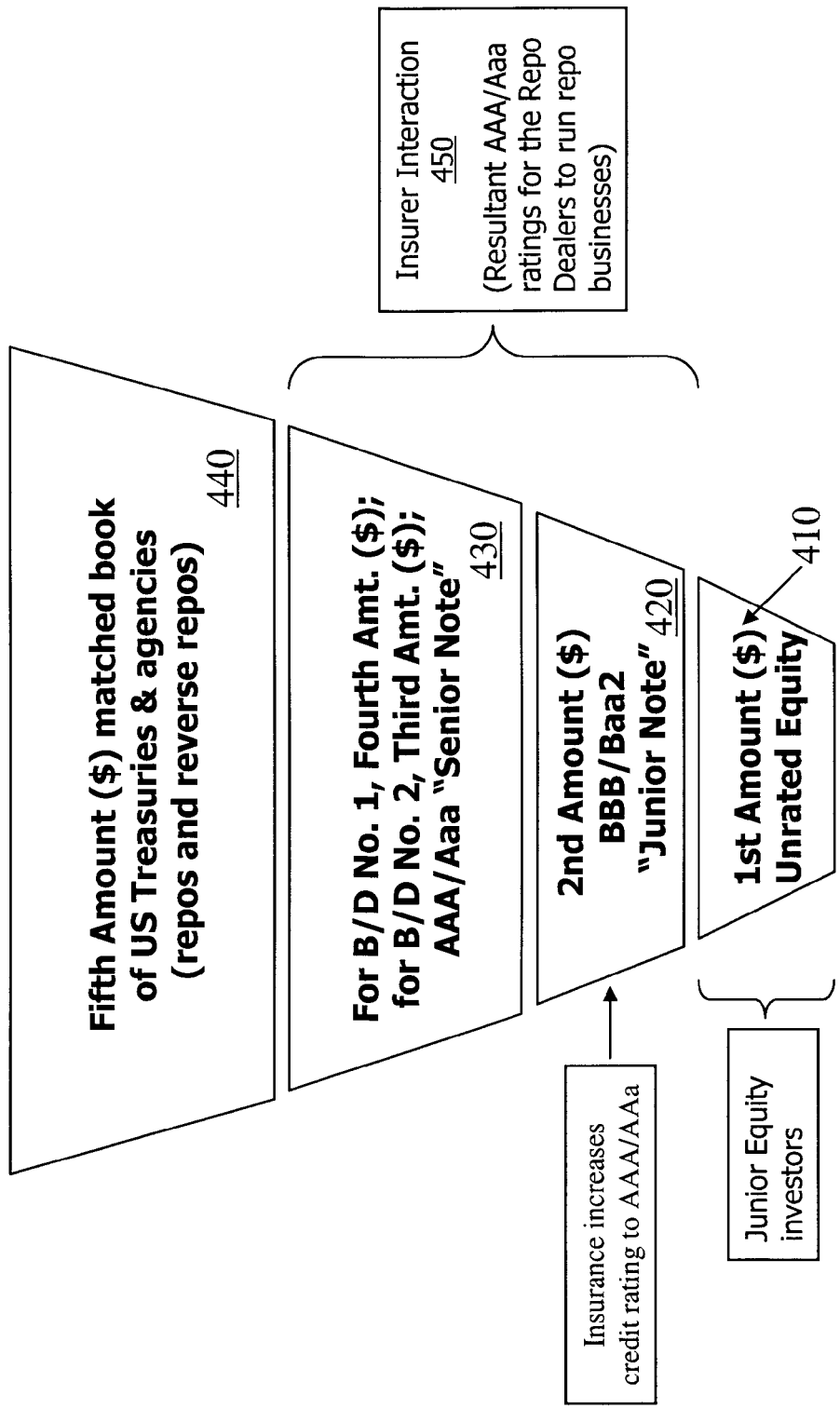
FIG. 4 illustrates an example tiered capital structure with varying risk, according to one embodiment of the present invention.

An insurer 355, 360 may also be employed in the present invention, for the purposes described below in connection with FIG. 4, illustrating a multi-tiered capitalization structure. One or more insurers can be involved with insuring notes for a single Parent Company (e.g., only Parent Co. No. 1 315) or Repo Dealer (e.g., only repo Dealer No. 1 325) against losses, or alternatively, one insurer can insure multiple Parent Companies/Repo Dealers (e.g., both Parent Co. No. 1 315, Repo Dealer No. 1 325, and Parent Co. No. 2 320, Repo Dealer No. 2 330) against losses.

Junior and senior note purchasers 365, 370, 375 and 380 provide cash to the parent company 315 or 320, with which they are investing, in exchange for which a promissory note is received by the purchaser, 365, 370, 375 or 380.

A portion of the capital needed is, in certain embodiments, provided by the Holding Company 310. As discussed in connection with FIG. 4, this is un-rated and un-insured equity in some embodiments, and is the first to be lost should the respective Repo Dealer 325, 330 lose money. Naturally, the Holding Company 310 may develop any number of parent companies, and any number of Repo Dealers.

According to a third aspect of the present invention, a multi-tiered capitalization structure is implemented for financing the startup of a company. In certain embodiments, this company is a Repo Dealer (e.g. 220, 325, 330) for running a repo matchbook. This aspect of the invention advantageously allows a company, in particular a Repo Dealer, to raise a large amount of capital to support trading operations. FIG. 4 illustrates a tiered capital structure for an example Repo Dealer created by and operating in accordance with the subject invention. It should be understood that though this third aspect of the invention may be implemented in conjunction with other aspects of the invention, it may also be implemented separately.

In this third aspect of the present invention, funding is obtained from multiple sources in a tiered-risk arrangement. That is, a structure under which profit and risk are shared unevenly among investing parties, is provided. Certain investors or groups of investors are provided higher returns commensurate with higher risk, the specific magnitudes of which are predetermined. In this embodiment, a Repo Dealer 325, 330 is capitalized with highly structured "synthetic equity" to achieve the highest possible credit ratings (preferably, AAA/ Aaa). To achieve this, respective agreements are made between the Repo Dealer 325, 330 and investing parties that outline the respective risk that they will undertake and the respective percent of profit that they will receive.

In the embodiment of FIG. 4, a first amount (e.g., $40 Million) of un-rated equity 410 is purchased by a first group of investors ("Junior Equity Investors"). A second amount (e.g., $20 Million) in Junior Notes 420 are purchased by a second group of investors, and a third amount 430 (e.g., $240 Million) for a first Repo Dealer 325 (and another amount (e.g., $140 Million) for a second Repo Dealer 330) are raised through offering Senior notes to a third group of investors. Naturally, these quantities are all exemplary and may in-fact be any amount, as would be predetermined to be necessary. Further, the first, second and third groups of investors are not mutually exclusive. Participants in one tier of investment may participate in one or more other tiers of investment. On top of this funding portion (410, 420 and 430), lie what ultimately is the largest portion of a Repo Dealer's credit strength—the collateral underlying the Repo Matchbook 440 being run by the Repo Dealer 325. In this embodiment, the Repo Matchbook (or "matched book") 440 comprises trades backed up by a fifth amount (e.g., $15 Billion) of collateral in the form of U.S. Treasuries and the like. Again, depending on the embodiment, this amount may vary.

Should the Repo Dealer become insolvent, the collateral used to secure the Repo agreements is liquidated in order to offset any losses suffered by the Repo Dealer's counterparties. In this embodiment, the funds for doing this would be part of the fifth amount (e.g., $15 Billion). In a situation where daily margin requirements have been met, any loss should be essentially zero. The collateral inherent in Repos adjusted for the daily margin, acts as a first line of defense, helping protect from other losses.

However, should the collateral be insufficient to cover the loss, it is absorbed sequentially in segments starting with the bottom segment illustrated, which represents a first amount (e.g., $40 million) of unrated Junior Equity 410. This money is not insured and is the first to be lost if any losses are experienced by the Repo Matchbook 440. Typically, since the Junior Equity investors have assumed a higher risk, they are compensated appropriately with an increased rate of return on their investment as compared with the investors in the Junior or Senior Notes 420, 430.

If further losses are sustained, beyond this first amount (e.g., $40 million), the Junior and Senior Notes 420, 430 are the next and last, respectively, to lose money. However, these Notes are typically insured against any loss, though depending on the embodiment, this can vary. Without insurance, the Junior Note 420 is rated BBB/Baa2, but with insurance, AAA/Aaa ratings are achieved. Without insurance, the Senior Note 430 is rated AAA/Aaa, and thus, any insurance would make such an investment that much more secure. With respect to either the Junior or Senior Notes 420, 430, the only real risk is that an insurance company could, itself, become insolvent at essentially the same time the Repo Dealer does.

Proper implementation of Repo Matchbook's 440 risk management policy (described in more detail below) affords a lower probability of substantial losses. However, a possibility for some losses exists. Accordingly, some investors will agree to undertake higher risk by being among the first party or parties to absorb any losses ("Junior Equity") sustained by the Repo Matchbook 440. These investors are, depending on the implementation, compensated with increased rates of return on their investments. The particular gradations of risk and return depend on the specific implementation, but the involvement of multiple investing parties is easily implemented under this system.

As a further assurance to the security of the investors in the Junior and Senior Notes 420, 430, and thus a further boost to the credit ratings of the Repo Dealer, an insurance carrier may be retained to secure investments against loss in excess of Junior Equity. Depending on the specific implementation of the system, different tiers of risk are insured to different degrees. For example, if a party invests $5 million in the Junior Note 420, with the understanding that it is undertaking a sizable risk in doing so (i.e., this party would be the second to lose its investment after the unrated equity investors), an insurance carrier may secure all or a portion of the risk, naturally for a cost. However, the resultant risk for the investor is substantially reduced.

In another aspect of this embodiment, the capital structure and risk management are predetermined in order to achieve the highest possible credit ratings ("AAA" from Standard & Poor's Ratings Services ("S&P") and "Aaa" from Moody's Investors Service, Inc. ("Moody's" and, together with S&P, the "Rating Agencies")). According to the invention, the precise amounts where the above-described tiers (410, 420, 430) are defined are dependent upon the risk foreseen for the business the Repo Dealer is undertaking. Accordingly, to achieve the highest possible rating, an appropriate capital structure must be implemented, but additionally, a structure where risk is reduced wherever possible is beneficial in obtaining an increased credit rating.

Risk Management

A fourth aspect of the present invention relates to an implementation of a risk management policy including unique financial models and guidelines for the operation of a broker-dealer, in particular, Repo Dealer 325. Incorporating strict guidelines into a trading system, which define particular types of transactions, tenors (contract length, etc.), these strict guidelines, in one embodiment, must be followed in order to prevent an early wind-down (contract termination), or other substantial effect. Because of these strict guidelines, a Repo Dealer operating in accordance with this aspect of the invention can achieve more favorable credit ratings than might otherwise be possible. Accordingly, such Repo Dealer will benefit from being able to enter into contracts with counterparties that require very high credit ratings among counterparties, which otherwise might not be possible.

The two primary types of risks in repo transactions are the interest rate risk created by the above-described gap (because of maturity and interest rate differences between repos and corresponding reverse repos), and the credit risk associated with the ability of the counterparty to each repo and reverse repo transactions to fulfill its contractual obligations, such as meeting daily margin calls and either repurchasing or reselling the underlying security upon the completion of the contract term. Thus, depending on the embodiment, to manage these risks, the activities of each of portfolio under the invention is governed by a risk management policy, described in further detail below.

Interest Rate Risk Management

The success of a Repo Dealer operating in accordance with the invention depends in part on the Repo Dealer's ability to manage interest rate risk associated with fluctuations in the market value of portfolios as a result of changes in interest rates. According to the invention, interest rate risk is managed by managing maturity "gaps" in repo and reverse repo transactions so that all transactions, taken as a whole, in each of portfolio will provide a positive interest rate spread at an appropriate level of interest rate risk. The management of the interest rate risk, including that created by the gap, begins with the development of various interest rate risk measurements and limits.

Depending on the specific implementation, these measurements and limits are then input into an information processing system, which in some embodiments is TradeBlazer® (a computer-based trading system). Also depending on the embodiment, all repo and reverse repo transactions are entered into the information processing system, which will calculate the impact of each transaction on the interest rate risk exposure of the entire portfolio based on several considerations, including current and historical interest rates and movements of these rates. As rates change continuously, the information processing system automatically recalculates risk measurements and compliance with pre-set limits. Transactions that exceed such limits trigger special notifications to personnel who can then take appropriate steps to remedy such situations.

Monitoring the status of interest rate risk position is critical to success of a Dealer operating under the present invention. Thus, the information processing system may be configured to generate notices and other reports regarding a portfolio's risk limits. Depending on the implementation, these notices and reports are regularly monitored by a management team, but also, in one embodiment by a specific Risk and Control Officer.

Depending on the implementation, and in some embodiments solely for the purposes of interest rate risk management, a Dealer operating in accordance with the present invention may enter into hedging transactions utilizing U.S. government securities and exchange traded futures contracts, such as Euro dollar futures contracts and U.S. government futures contracts, including, without limitation, T-Bill futures, Fed Funds futures and other money market instrument futures.

In addition to reducing interest rate risk, matching, closing or hedging gaps will, under certain circumstances, allow the Dealer to re-deploy the capital underlying the associated transactions. Similarly, if a repo and reverse repo are executed with the same counterparty and involve similar types of securities and have the same end dates (in other words, the gap has been matched, closed or hedged with the same counterparty), the repo and reverse repo may be netted pursuant to FIN 41. This means that the asset and corresponding liability (or liability and corresponding asset, as the case may be) are offset or substantially hedged and are no longer required to be reflected on the balance sheet. Accordingly, the net capital (i.e., the unrated equity, junior and senior notes) needed to support the transactions is released and may be redeployed to support new transactions. Thus, netting allows the Dealer to increase the gross volume of outstanding transactions and the turnover of the balance sheet, thereby increasing returns without increasing balance sheet size and capital usage.

Counterparty Credit Risk Management

Counterparty credit risk relates to the ability of the Repo Dealer's counterparties to satisfy their obligation on an agreed upon date to re-sell the underlying securities back to the Repo Dealer (in the Dealer's repo transactions) or repurchase the securities back from the Repo Dealer (in the Dealer's reverse repo transactions) at the agreed upon price and to fulfill their other contractual obligations (such as meeting margin calls). In one embodiment, the Repo Dealer manages counterparty credit risk by establishing credit limits for each counterparty, and may periodically reevaluate those credit limits, monitoring compliance with such counterparty credit limits in real time through the information processing system, utilizing standard industry documentation and clearing as many transactions as possible through the FICC (the industry clearing house for repurchase and reverse purchase transactions).

In some embodiments, according to the present invention, on the evening of every trade cleared through the FICC, the FICC will, in effect, interpose itself between the Dealer and the original counterparty to the transaction, thereby becoming the Dealer's counterparty. In respect of every transaction cleared through the FICC, potential credit risk associated with the original counterparty to such transaction will be transferred to and assumed by the FICC.

In addition to counterparty credit limits, the Repo Dealer also may determine to transact only with counterparties whose insolvency would, if occurring, be administered under a legal framework such as the U.S. Bankruptcy Code or the Federal Deposit Insurance Act, which has special provisions designed to facilitate close out and netting of repo and reverse repo transactions, and to counterparties who settle through FICC.

Fluctuations in the market value of U.S. Securities, including fluctuation caused by changes in interest rates generally, may adversely impact the value of repo portfolios. Accordingly, as one risk mitigant under the present invention, contracts are limited to repo and reverse repo transactions in U.S. Securities that are U.S. Treasury securities or debt or mortgage-backed securities issued by the Federal National Mortgage Association, the Federal Home Loan Mortgage Corporation, the Government National Mortgage Association, the Federal Farm Credit Banks or the Federal Home Loan Banks.

In a preferred embodiment, the Repo Dealer will generally run "gaps" in its matched book repo and reverse repo transactions, resulting in differences in the average weighted maturities between repo transactions, reverse repo transactions and hedging transactions, to take advantage of interest rate spreads in the repo and reverse repo market. If long-term interest rates are higher than short-term interest rates, the Repo Dealer will seek to finance its longer-term assets with shorter-term liabilities. Conversely, if short-term interest rates are higher than long-term interest rates, the Repo Dealer will seek to finance its shorter-term assets with longer-term liabilities. Depending on the specific embodiment, from time to time, the Repo Dealer may also enter into hedging transactions utilizing U.S. government securities and exchange traded futures contracts in order to minimize its exposure to changes in the yield curve.

Typically, the management of these "gaps" in the Repo Dealer's matched book repo and reverse repo transactions will be formulated on an ongoing basis based upon historical market trends, in particular historical movements in interest rate spreads and the repo market yield curve.

Wind-Down of the Repo Dealer's Repo Program

In one embodiment, the Repo Program of the subject Repo Dealer will commence winding down for any predetermined reason. Among these predetermined reasons are instances of an entity (such as a servicer or administrator) having obligations to contracts held by the Repo Dealer, and not being able to fulfill such obligations within a predetermined period of time. Reasons may include lack of sufficient funds, changes in law causing the participation of one entity to become illegal, equipment failures, human error and the like.

Upon the occurrence of a Wind-down Event selected actions may be required of a Repo Dealer operating in accordance with this aspect of the invention. Such actions may include that:

(a) The Repo Dealer may enter into new transactions in accordance with this aspect of the invention, but only for purposes of (i) reducing the risk exposures of the its portfolio that existed as of the wind-down Date and (ii) otherwise implementing the winding down of the Repo Dealer's portfolio and its Repo Program without increasing the risk exposures of the Repo Dealer's portfolio.

(b) The Repo Dealer may be required to reduce the portfolio interest rate sensitivity or "dollar value of a basis point" ("DV01") of the Repo Dealer's portfolio to a predetermined amount (e.g., $5,000) per basis point or less as soon as practicable after the occurrence of a wind-down Event.

(c) The Repo Dealer may be required to use its best efforts to reduce as soon as practicable the magnitude of susceptibility of the Repo Dealer's portfolio to losses, or what may be termed the "Value-at-Risk" (or "VaR") in a commercially reasonable manner, with respect to the Repo Dealer's portfolio, including by attempting to match the tenor of the transactions that Repo Dealer enters into for purposes of clause (b) above to the tenor of the existing transactions in the Repo Dealer's portfolio.

(d) The Repo Dealer may be required to use its best efforts (I) to unwind or novate (e.g., substitute one counterparty with a substitute counterparty) as soon as practicable to third parties, in a commercially reasonable manner, any existing repo and reverse repo transactions in the Repo Dealer's portfolio and/or (II) to enter as soon as practicable into repo and reverse repo transactions, in a commercially reasonable manner, for the purpose of offsetting (and providing for netting with) existing repo and reverse repo transactions.

(e) The Repo Dealer may be required to use its best efforts to eliminate as soon as practicable in a commercially reasonable manner the volatility risks peculiar to predetermined securities subject to transactions in the Repo Dealer's portfolio as soon as practicable but in some embodiments, no later than within a predetermined time frame.

(f) The Repo Dealer may be required to use its best efforts to enter as soon as practicable into repo and reverse repo transactions, in a commercially reasonable manner, with FICC members for the purpose of offsetting (and providing for netting with) existing repo and reverse repo transactions with the FICC.

The risk management policy is implemented to reduce overall risk of the subject Repo Dealer, according to the present invention. Risk related to counterparties, as well as interest rates are ideally minimized according to this policy. Typically, the risk management policy governs managers, officers, employees and other agents of the Repo Dealer with respect to each transaction arranged and/or executed by such person for or on behalf of the Repo Dealer.

One element of the risk management program, according to the present invention, is that a Repo Dealer operating in accordance with the risk management program is not able to enter into a transaction, unless such transaction (a) is a repo transaction, bond transaction or hedge transaction or an investment in, or a purchase or other acquisition of, other permitted investments that are not prohibited by this risk management policy or (b) is specifically authorized by a Board of Managers.

According to this aspect of the invention, the criteria of the risk management policy is typically applied to every new or modified transaction of the Repo Dealer to assure compliance with the risk management policy.

In some embodiments, the criteria for the risk management policy can be chosen from the below-described, but in other embodiments, the criteria for the risk management policy are cumulative, in which case all of the below-described criteria must be met.

In some (or all) embodiments of the risk management policy, upon the downgrade of a credit rating for any counterparty, the Repo Dealer may be required to use commercially reasonable efforts (including forbearance from action) to reduce the Repo Dealer's risks related to outstanding transactions with such counterparty.

Upon the violation of any of the limitations and criteria of this risk management policy or the occurrence of any other detrimental portfolio event, the Repo Dealer may be enabled to use its best efforts to bring its portfolio within compliance of this risk management policy or cure such portfolio event, as the case may be. In some situations, a board of directors (or other equivalent entity) of the Repo Dealer may direct the Repo Dealer how to act or direct the Repo Dealer to refrain from taking any steps.

Typically, a computerized system is used to monitor compliance with the risk management system. In some embodiments, the computerized system for risk management is used for purposes of applying, and testing compliance with, any limitation or criterion contained in this risk management policy. Values that may be used in such calculation are aggregate net transaction amount, any DV01, mark-to-market value, transaction amount or value-at-risk.

Counterparty Criteria

In accordance with the risk management policy (or simply "policy"), certain counterparties or types of counterparties may or may not be eligible for dealing with the subject Repo Dealer. Classes of counterparties allowable can be categorized as follows: (i) Rated Parties; (ii) FICC Members; and (iii) Special Parties (each as described below). Certain classes of Counterparties have subclasses (also as described below). Each Counterparty must be a member of at least one of the three primary classes, though need not be a member of a subclass, according to the invention.

According to the invention, a Rated Party is an entity with respect to which there is a Credit Rating. The policy, in this embodiment, recognizes three subclasses of Rated Parties: (A) Primary Dealers; (B) Central Banks and (C) Money Market Funds.

A Primary Dealer, in accordance with the invention, is each entity named on the most recent list, published by the Federal Reserve Bank of New York, of primary dealers, provided that such party is a Rated Party at such time. In certain embodiments, the policy recognizes one subclass of Primary Dealers, specifically, Leading Dealers.

A Leading Dealer, in accordance with the invention, is each of J.P. Morgan Securities, Inc., Credit Suisse First Boston LLC, Goldman, Sachs & Co., Lehman Brothers Inc., Merrill, Lynch, Pierce, Fenner & Smith Incorporated, Morgan Stanley & Co. Incorporated, Citigroup Global Markets Inc., Deutsche Bank Securities Inc. and UBS Warburg LLC, provided that such party is a Primary Dealer at such time.

A Central Bank is defined for the purposes of the invention as the central bank of a Foreign Sovereign that is a member of the Organization of Economic Co-operation and Development or another entity authorized, empowered or generally recognized by the applicable laws, regulations or customary practices of such Foreign Sovereign to serve the functions generally performed by central banks or central monetary authorities.

A Money Market Fund is defined for the purposes of the invention as each registered investment company under (and as defined in) the Investment Company Act that is entitled to hold itself out to investors as a "money market fund" pursuant to Rule 2a-7 under the Investment Company Act.

An FICC Member is defined for the purposes of the invention as any entity, other than a Special Party (described immediately below) (excluding low rated parties, managed funds and unrated parties), that is a netting member of the FICC under the policies and procedures of its Government Securities Division at such time.

A Special Party is defined for the purposes of the invention as each entity within the following eight subclasses of entities: (A) Managed Funds; (B) Insurance Companies; (C) Municipalities; (D) Credit Unions; (E) Foreign Parties; (F) Trusts; (G) Low Rated Parties; and (H) Unrated Parties. In this sense, a low rated party is an entity with a credit rating is equal to or lower than "BBB", from S&P, or "Baa2", from Moody's, at such time, other than an FICC Member (with respect to an FICC Transaction).

An Unrated Party is defined for the purposes of the invention as an entity that has no Credit Rating at such time, other than a Trust, Managed Fund or an FICC Member (with respect to an FICC Transaction).

In some embodiments, the Repo Dealer cannot enter into a repo transaction or bond transaction with any entity, unless a Board of Managers, or equivalent body, has approved such entity as a "counterparty" in accordance with the risk management policy.

In some embodiments, the Repo Dealer cannot enter into a repo transaction or bond transaction with any foreign entity, unless such entity is incorporated or otherwise organized under the laws of the jurisdiction of a foreign sovereign with credit ratings equal to or higher than a predetermined level, in one "AA", from S&P, and "Aa2", from Moody's.

Further, in some embodiments, the Repo Dealer cannot enter into a repo transaction or bond transaction with any foreign entity, unless the sum of the transaction amounts (including such repo transaction or bond transaction) of all repo transactions and bond transactions in the portfolio with counterparties incorporated or otherwise organized in certain Moody's country groups (e.g., group I, II, III, etc.) will not exceed predetermined percentages of the sum of the transaction amounts of all repo transactions and bond transactions in the portfolio.

Ratings Criteria, Etc.

In some embodiments, the Repo Dealer is not allowed to enter into a contract with any counterparty, other than a Central Bank, unless the counterparty's Credit Ratings are equal to or higher than a predetermined level, in one embodiment "BBB+", from S&P, and "Baa1", from Moody's. Similarly, the Repo Dealer may not be allowed to enter into a contract with a Central Bank, unless its Credit Ratings are equal to a predetermined level, in one embodiment "AAA", from S&P, and "Aaa", from Moody's.

Depending on the embodiment, the Repo Dealer may or may not be allowed to enter into a Repo Transaction with any low-rated counterparty, unrated party, FICC Member (with respect to an FICC Transaction) or Managed Fund.

As a further assurance against unnecessarily risky contracts, the Repo Dealer, in some embodiments is disallowed from entering into bond transactions with any counterparty, with credit ratings less than a predetermined level, in one embodiment "A−", from S&P, and "A3", from Moody's.

In certain embodiments, transactions are limited by the risk management policy to transactions only with FICC members. In other embodiments, there are limits on the amount of an investment with non-FICC entities. In such embodiment, there may be limits on transactions with all counterparties except with FICC members.

While transactions are sometimes limited to being with counterparties having the highest possible credit ratings ("AAA", from S&P, and "Aaa", from Moody's), exceptions may be made, depending on the specific implementation. For example, in one embodiment, if the tenor of the contract is limited, and the member is a FICC member, a contract may be entered regardless of the counterparty's credit rating.

In many embodiments, the tenor of a contract is limited on a basis of the counterparty's credit rating. For example, in one embodiment, if a counterparty has a credit rating between "AA" up to but excluding "AAA", from S&P, and from and including "Aa2" to but excluding "Aaa", from Moody's, the Tenor of such transaction must be limited to be equal to or less than 365 days.

Similarly, as credit ratings decrease, or the anticipated reliability of a counterparty is decreased (for any reason), the maximum tenors of contracts therewith are reduced. For example, if a counterparty's rating is between "A" and "AA," excluding "AA", from S&P, or a corresponding Moody's rating, then the tenor may be limited to, for example 185 days, and so on. Table 4, below illustrates example tenor limits based on counterparty credit ratings.

TABLE 4

| CREDIT RATING TABLE #1 S&P: ≧AA to <AAA, and Moody's: ≧Aa2 < Aaa | | CREDIT RATING TABLE #2 S&P: ≧A to <AA, and Moody's: ≧A2 < Aa2 | | CREDIT RATING TABLE #3 S&P: ≧BBB+ to <A, and Moody's: >Baa1 < A2 | |
|---|---|---|---|---|---|
| Range of Terms (in days) | Maximum Transaction Amount | Range of Terms (in days) | Maximum Transaction Amount | Range of Terms (in days) | Maximum Transaction Amount |
| >0 to ≦365 | $2,000,000,000 | >0 to ≦185 | $2,000,000,000 | >0 to <95 | $1,000,000,000 |
| >95 to ≧365 | $1,000,000,000 | >7 to ≦185 | $1,000,000,000 | >7 to <95 | $750,000,000 |
| >365 | 0 | >31 to ≦185 | $750,000,000 | >31 to ≦95 | $500,000,000 |
| | | >62 to ≦185 | $500,000,000 | >62 to ≦95 | $250,000,000 |
| | | >185 | 0 | >95 | 0 |

As a further risk mitigant for certain special parties, such as managed funds, insurance companies, municipalities, low-rated and unrated entities, etc., a Repo Dealer operating in accordance with the present invention may be limited to entering into repo or bond transactions unless the total amount of transactions with that particular party is below a predetermined amount. An example guideline for limiting tenors of contracts where transaction amounts are at or above certain levels is shown below in Table 5.

TABLE 5

| Range of Terms (in days) | Maximum Transaction Amount |
|---|---|
| >0 to ≦95 | $750,000,000 |
| >7 to ≦95 | $500,000,000 |
| >31 to ≦95 | $250,000,000 |
| >62 to ≦95 | $100,000,000 |
| >95 | 0 |

A further risk mitigant is that a maximum threshold amount for maintenance of margins, is limited, depending on the type of counterparty. That is, if a margin is required of a party due to periodic valuation fluctuations, parties are not required to post the margin until the margin reaches a predetermined level (the "threshold amount"). Since some counterparties have a higher credit-worthiness, these counterparties are allowed a higher threshold for posting margins. Table 6, below sets-forth an example schedule for such limitations.

TABLE 6

| Type of Counterparty | Maximum Threshold Amount |
|---|---|
| Leading Dealers | $2,000,000 |
| Primary Dealers other than Leading Dealers | $1,000,000 |
| All Other Counterparties | $500,000 |

In certain embodiments, the Repo Dealer is not allowed to enter into a contract unless the counterparty for the contract is known. This, for example, can become an issue, (for example, on a blind-brokerage basis).

When entering into a transaction, the Repo Dealer, in a preferred embodiment, is limited to transactions involving certain eligible securities. Such eligible securities may be selected from, but are not limited to:

(a) any bills, notes and bonds issued by the United States of America;
(b) any Plain Debt Security (a debt security that is senior, full-recourse indebtedness of the issuer) issued by any Agency. Such Agencies include, for example, the Federal National Mortgage Association (Fannie Mae), Federal Home Loan Mortgage Corporation (Freddie Mac), Government National Mortgage Association (Ginnie Mae), Federal Farm Credit Banks (FFCB) and Federal Home Loan Banks (FHLB)); or
(c) any Mortgage Pass-Through Security issued by any Agency. Such Mortgage Pass-Through Security is meant, in this instance, as a debt security that is secured by a pool of fixed-rate or variable rate mortgage loans.

Then the loss of an entire portfolio of a Repo Dealer operating in accordance with the present invention exceeds a predetermined amount, transactions may be limited to predetermined tenors. In such an instance, the type of contract, and the prospective counterparty in question are taken into account. In one embodiment, an exception is made for special transactions for the purposes of reducing losses.

Yet another risk mitigant is a limitation on forward transactions. Such transactions may be limited by the amount of time before a start date that a contract can be agreed upon. In some embodiments, special considerations are given to FICC members, in which the length of time in which a contract can be agreed upon is longer than with non-FICC members. For example, in one embodiment, transactions with FICC members may be entered up to about two years in advance. In contrast, with non-FICC members, such contracts may only be entered up to about 95 days in advance.

As a partial assurance over increased and multiple losses over consecutive days, daily margins may be required to be posted by counterparties with which the Repo Dealer operating in accordance with the invention deals. The margin requirement may be dependent upon the type of counterparty in question, as well as the type of transaction. When implemented, the margin may be required daily, and on each Business Day, the Repo Dealer may place a margin call to each counterparty.

Another limitation that may be implemented on a Repo Dealer of the present invention, in order to reduce risk, is that the Repo Dealer may not enter into any repo transaction or bond transaction unless the weighted average of the remaining terms for all repo transactions and bond transactions in the portfolio, after giving effect to such transaction, is equal to or less than 365 days. In such embodiment, the weighting for such weighted average is based on the transaction amount of each applicable transaction in the portfolio.

Moreover, there may be individual limits placed on particular classes or segments of classes of agreements (repos, reverse repos, mortgage-backed securities, bonds, etc.). For example, there can be a predetermined limit placed on the amount invested in any one, more than one or all types of transactions with which the Repo Dealer deals.

Figure 5:
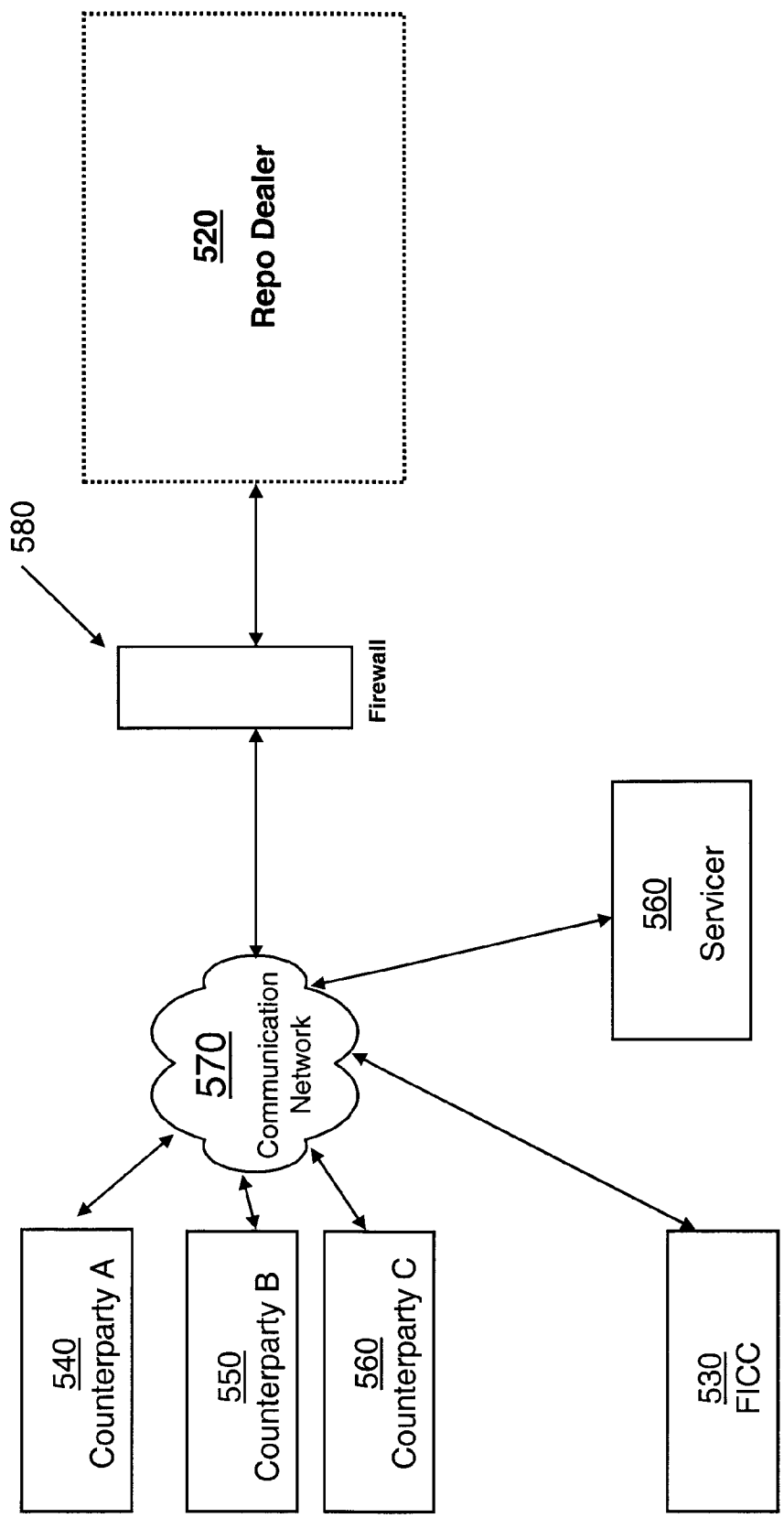
FIG. 5 is a diagrammatic representation of example computer system interactions between the subject Repo Dealer and other entities, in accordance with the present invention.

FIG. 5 illustrates an example system with which the subject Repo Dealer 220, in the embodiment of FIG. 2, interacts with counterparties (240, 250, 260) and the FICC 230. In FIG. 5, computer systems of each entity are illustrated. For example, rather than the Repo Dealer 220, the Repo Dealer System 520 is represented, and so forth, for each entity. In this embodiment, the Repo Dealer System 520 is protected by a firewall 580, through which the Repo Dealer System 520 communicates with the systems of Counterparties A B and C 540. 550. 560, with the system of the FICC 530, as well as with the Servicer's System 560. Communication also occurs through a communication network 570, which may be a secure network, the Public Switched Telephone Network, the Internet, or equivalent. For reasons of security, if an insecure network is used, data protection steps such as encryption are particularly important in order to avoid confidential information from being intercepted and/or tampered with. As an alternative, different modes of communication can be used between the Systems of each entity. That is, some communication can be carried out over telephone lines, other communication over the Internet, and other communication over a private, secure network.

Moreover, not all communication need be direct from computer to computer. Instead, a person (employee, etc.) of the Dealer or another entity can contact another person at another entity (e.g., "counterparty A") to carry out some portion of a trade or agreement, without directly using any computer system. Naturally in such situation any decision made would likely ultimately be inputted into a computer in some manner.

Figure 6:
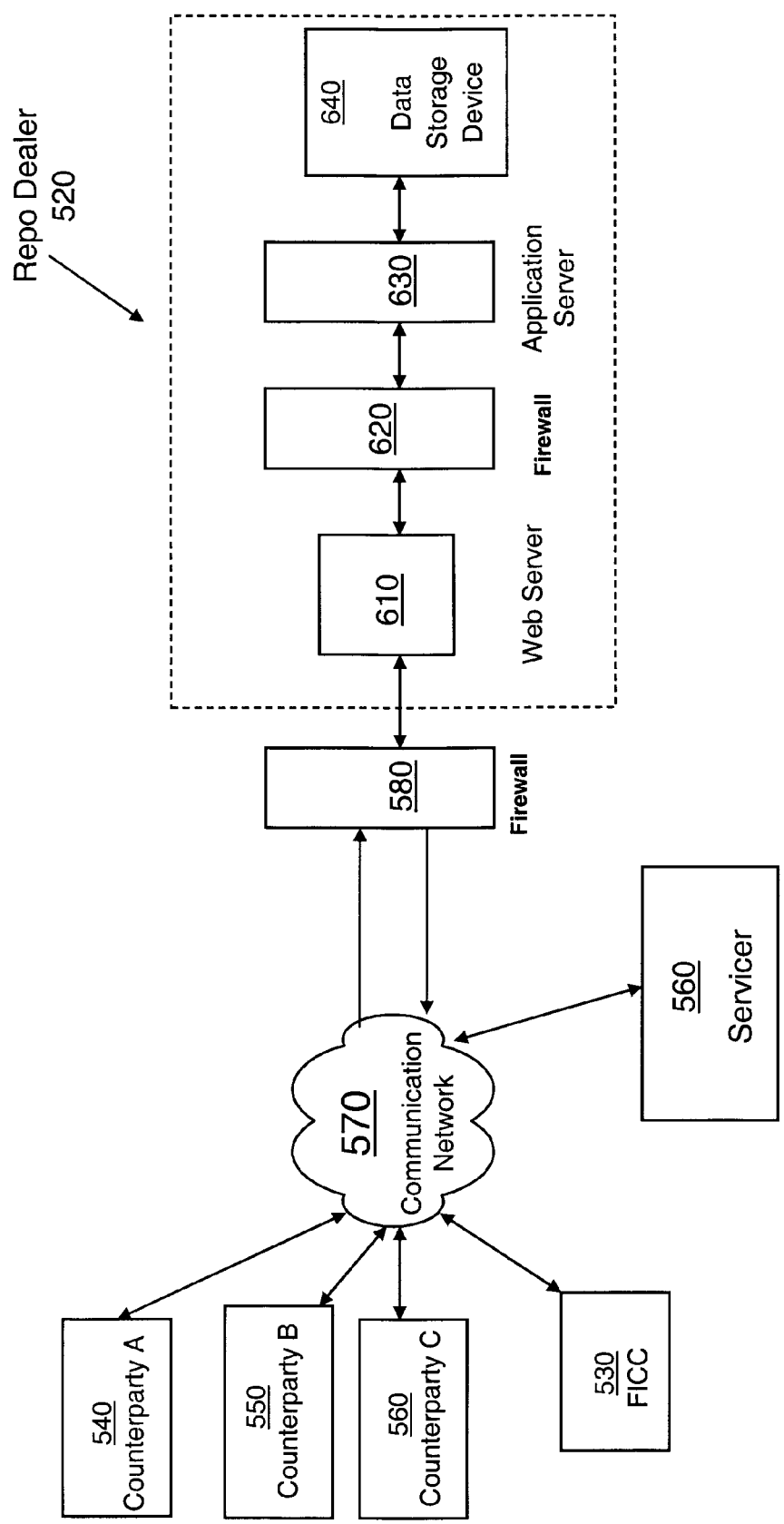
FIG. 6 is a diagrammatic representation of computer system interactions between the subject Repo Dealer and other entities, in accordance with the present invention, showing further detail of an example computer system of the subject Repo Dealer.

FIG. 6 illustrates in further detail, example inner components of the Repo Dealer computer System 520. Such System 520 may include, depending on the embodiment, a web server 610 or other equivalent interface means for communicating over the internet, other or additional types of communication networks. An additional firewall 620 may be employed within the Repo Dealer System 520, in conjunction with an application server 630 and a data storage device 640. The application server 630, as implied by its name, supplies the necessary computational power to run software for operating the Repo Dealer System 520

FIG. 7 illustrates in still further detail, databases contained within the data storage device 640. Databases utilized and stored by the Repo Dealer System 520 are Daily Transaction Database 722, Counterparty Database 724 and Archived Transaction Database 726, but alternative and/or databases may be utilized, as desired. The Daily Transaction Database 722 includes information needed to carry out the daily operations of the Repo Dealer System 520. Such information may include counterparty net position (relative to gains and losses) on all contracts. When each day's activities are closed out and are no longer required for transactions, the data within the Daily Transaction Database 722 may be transferred to the Archived Transaction Database 726 for later reference. The Counterparty Database 724 may include, depending on the embodiment, all pertinent information related to each Counterparty, including repo and reverse repo agreements with each counterparty, and the associated necessary information such as start and end dates, amount of transaction, contact information, etc.

It is within the Repo Dealer System 520 that software for operating the Repo Dealer is run. In an alternative embodiment, the software may be run elsewhere and accessed remotely. In either case, however, software, such as the above-described information processing system (computerized trading system) may be thus maintained and utilized. It is also within this repo Dealer System that the Risk Management occurs, to a large degree. Since so many aspects of the operation of the Repo Dealer 220, and thus the Repo Dealer System 520 are carefully controlled, the most practical manner for accurately achieving the control is to allow the Repo Dealer System 520 to monitor all transactions.

It is to be understood that though not specifically set forth herein, other embodiments are possible while still keeping with the spirit of the invention. Additionally, in addition to the above-described aspects of the invention, further arrangements and aspects are possible.

We claim:

1. A method for managing a repurchase agreement matchbook comprising:
    monitoring, by a computer system, a tenor of each individual contract of the repurchase agreement matchbook to a maximum first predetermined period of time, so that each tenor does not exceed said first predetermined period of time;
    monitoring, by said computer system, a weighted-average tenor of the matchbook to a maximum second predetermined period of time, so that the weighted-average tenor does not exceed said second predetermined period of time;
    initiating, by said computer system, an automatic wind-down if a loss of equal to or greater than a predetermined magnitude is realized during a predetermined third period of time;
    matching assets and liabilities to one another, by said computer system, to determine and secure one or more interest rate differentials for one or more predetermined intervals of time;
    calculating, by said computer system, a netting of assets and liabilities of different contracts in the repurchase agreement matchbook associated with one counterparty;
    monitoring each contract in the repurchase agreement matchbook, by said computer system, to assure that it is of a preapproved type;
    monitoring input data, by said computer system, to assure that a time for which a contract is executed in advance of a closing date does not exceed a fourth period of time;
    monitoring continuously each contract, by said computer system, to assure that any applicable trading policy is not violated; and
    receiving, by said computer system, data pertaining to daily margins posted by preselected counterparties with which contracts are held.

2. The method of claim 1, further comprising:
    reviewing a counterparty's operations and creditworthiness in advance of entering a contract with the counterparty.

3. The method of claim 1, further comprising:
    netting assets and liabilities of different contracts in the repurchase agreement matchbook arranged between each counterparty that is a member of a preselected entity.

4. The method of claim 3, wherein the preselected entity is The Fixed Income Clearing Corporation.

5. The method of claim 1, wherein the first predetermined period of time is two years;
    wherein the second predetermined period of time is one year; and
    wherein the third predetermined period of time is one business day.

6. The method of claim 1, wherein the fourth period of time is a maximum of thirteen weeks.

7. The method of claim 1, wherein the fourth period of tie is a maximum of forty five days.

8. The method of claim 1, wherein the predetermined type of contract required in the repurchase agreement matchbook is a United States Treasury security.

9. The method of claim 1, wherein the predetermined type of contract required in the repurchase agreement matchbook is a repurchase agreement backed by United States Treasury obligations.

10. The method of claim 1, further comprising:
    limiting a gap between a first date on which an interest rate for a repo transaction is determined, and a second date on which a corresponding reverse repo transaction is determined to a predetermined fifth period of time.

11. The method of claim 10, wherein the predetermined fifth period of time is 3.25 months.

12. The method of claim 1, further comprising:
    preselecting a maximum portfolio interest rate sensitivity of the repurchase agreement matchbook, wherein the portfolio interest rate sensitivity cannot exceed a predetermined value.

13. The method of claim 12, wherein the preselected maximum portfolio interest rate sensitivity is $400,000.00 per basis point chance in interest rate.

14. A computer system for managing a repurchase agreement matchbook, the computer system comprising:
    a memory; and
    a processor disposed in communication with said memory, said processor configured to:
        monitor a tenor of each individual contract of the repurchase agreement matchbook to a maximum first predetermined period of time, so that each tenor does not exceed said first predetermined period of time;
        monitor a weighted-average tenor of the matchbook to a maximum second predetermined period of time, so that the weighted-average tenor does not exceed said second predetermined period of time;
        initiate an automatic wind-down if a loss of equal to or greater than a predetermined magnitude is realized during a predetermined third period of time;
        match assets and liabilities to one another to determine and secure one or more interest rate differentials for one or more predetermined intervals of time;
        calculate a netting of assets and liabilities of different contracts in the repurchase agreement matchbook associated with one counterparty;
        monitor each contract in the repurchase agreement matchbook to assure that it is of a preapproved type;
        monitor input data to assure that a time for which a contract is executed in advance of a closing date does not exceed a fourth period of time;
        monitor continuously each contract, to assure that any applicable trading policy is not violated; and
        receive data pertaining to daily margins posted by preselected counterparties with which contracts are held.

15. A computer program product for managing a repurchase agreement matchbook, comprising a non-transitory computer readable storage medium having computer readable code means embodied in said medium, the computer readable program product comprising:
    computer readable program code adapted to cause a computer to:
        monitor a tenor of each individual contract of the repurchase agreement matchbook to a maximum first predetermined period of time, so that each tenor does not exceed said first predetermined period of time;
        monitor a weighted-average tenor of the matchbook to a maximum second predetermined period of time, so that the weighted-average tenor does not exceed said second predetermined period of time;

initiate an automatic wind-down if a loss of equal to or greater than a predetermined magnitude is realized during a predetermined third period of time;

match assets and liabilities to one another to determine and secure one or more interest rate differentials for one or more predetermined intervals of time;

calculate a netting of assets and liabilities of different contracts in the repurchase agreement matchbook associated with one counterparty;

monitor each contract in the repurchase agreement matchbook to assure that it is of a preapproved type;

monitor input data to assure that a time for which a contract is executed in advance of a closing date does not exceed a fourth period of time;

monitor continuously each contract, to assure that any applicable trading policy is not violated; and receive data pertaining to daily margins posted by preselected counterparties with which contracts are held.

16. The computer system of claim 14, wherein monitoring a tenor of each individual contract includes populating a database within the computer system with data of each individual contract of the repurchase agreement matchbook, said data comprising information related to a contract start date and a contract termination date; and comparing said data to other data stored within the computer system to verify that a system policy is not violated.

17. The computer system of claim 16, wherein said database is a database of contractual terms.

18. The computer system of claim 16, wherein said other data is stored within a database of contractual terms.

19. The computer system of claim 14, wherein monitoring a tenor of each individual contract includes receiving and storing data related to contractual terms, and comparing said data with a set of guideline data.

20. The computer system of claim 14, wherein monitoring a weighted-average tenor of the repurchase agreement matchbook includes populating a database within the computer system with data of each individual contract of the repurchase agreement matchbook, said data comprising information related to a contract start date and a contract termination date; and comparing said data to other data stored within the computer system to verify that a system policy is not violated.

21. The computer system of claim 14, wherein initiating a wind down is determined by comparing a magnitude of actual loss calculated by the computer system with the predetermined magnitude of loss, the predetermined magnitude of loss being stored within a database of the computer system.

22. The computer system of claim 21, wherein the predetermined magnitude of loss is stored within a database of contractual terms.

23. The computer system of claim 14, wherein contractual data is stored within the computer system, and the contractual data provides guidelines used to operate the computer system.

24. The computer system of claim 14, wherein data stored within the computer system provides guidelines used to operate the computer system, said data being based on an operating policy of a dealer operating the computer system.

25. The computer system of claim 14, wherein calculation of assets and liabilities is effected by comparing data stored within a transaction database.

26. The computer system of claim 25, wherein said transaction database includes data stored during the most recent business day.

27. The computer system of claim 25, wherein said transaction database includes data stored regularly over a term of a contract.

28. The computer system of claim 14, wherein monitoring of contract type is effected by comparing data entered by a user with guideline data stored within the computer system.

29. The computer system of claim 14, wherein the computer system monitors input data through comparison with guideline data stored within the computer system.

30. The computer system of claim 14, wherein said applicable trading policy is stored within a database of an application server within the computer system.

31. The computer system of claim 14, wherein data received pertaining to daily margins is received by the computer system over a communication network.

32. A computer system for managing a repurchase agreement matchbook, the computer system comprising:

a memory; and a processor disposed in communication with said memory, said processor configured to:

monitor a tenor of each individual contract of the repurchase agreement matchbook to a maximum first predetermined period of time, so that each tenor does not exceed said first predetermined period of time by populating a database within the computer system with data pertaining to each individual contract of the repurchase agreement matchbook, said data comprising information related to a contract start date and a contract termination date, and comparing said data to other data stored within the computer system to verify that a system policy is not violated;

monitor a weighted-average tenor of the matchbook to a maximum second predetermined period of time, so that the weighted-average tenor does not exceed said second predetermined period of time by populating a database within the computer system with data of each individual contract of the repurchase agreement matchbook, said data comprising information related to a contract start date and a contract termination date, and comparing said data to other data stored within the computer system to verify that a system policy is not violated;

initiate an automatic wind-down if a loss of equal to or greater than a predetermined magnitude is realized during a predetermined third period of time by comparing a magnitude of actual loss calculated by the computer system with the predetermined magnitude of loss, the predetermined magnitude of loss being stored within a database of the computer system;

match assets and liabilities to one another to determine and secure one or more interest rate differentials for one or more predetermined intervals of time, wherein calculation of assets and liabilities is effected by comparing data stored within a transaction database;

calculate a netting of assets and liabilities of different contracts in the repurchase agreement matchbook associated with one counterparty;

monitor each contract in the repurchase agreement matchbook to assure that it is of a preapproved type, by comparing input data on each contract with guideline data stored within the computer system;

monitor input data to assure that a time for which a contract is executed in advance of a closing date does not exceed a fourth period of time;

monitor continuously each contract, to assure that any applicable trading policy, stored within a database of the computer system, is not violated; and receive data pertaining to daily margins posted by preselected counterparties with which contracts are held.

\* \* \* \* \*